US011980892B2

(12) United States Patent
Bergman

(10) Patent No.: US 11,980,892 B2
(45) Date of Patent: May 14, 2024

(54) HORIZONTAL GRINDER WITH UPWARD ROTATING MILL AND CONTAMINATION BYPASS

(71) Applicant: C. W. Mill Equipment Co., Inc., Sabetha, KS (US)

(72) Inventor: Brian Bergman, Sabetha, KS (US)

(73) Assignee: C. W. Mill Equipment Co., Inc., Sabetha, KS (US)

( * ) Notice: Subject to any disclaimer, the term of this patent is extended or adjusted under 35 U.S.C. 154(b) by 0 days.

(21) Appl. No.: 17/813,287

(22) Filed: Jul. 18, 2022

(65) Prior Publication Data

US 2023/0021675 A1 Jan. 26, 2023

Related U.S. Application Data

(60) Provisional application No. 63/223,761, filed on Jul. 20, 2021.

(51) Int. Cl.
*B02C 13/284* (2006.01)
*B02C 13/286* (2006.01)
*B02C 13/31* (2006.01)

(52) U.S. Cl.
CPC .......... *B02C 13/284* (2013.01); *B02C 13/286* (2013.01); *B02C 13/31* (2013.01); *B02C 2013/28609* (2013.01)

(58) Field of Classification Search
CPC ......... B02C 13/02; B02C 13/06; B02C 13/34; B02C 13/286; B02C 13/31; B02C 2013/28609
See application file for complete search history.

(56) References Cited

U.S. PATENT DOCUMENTS 1,772,321 A 8/1930 Ossing
3,662,963 A * 5/1972 McClure ............... B02C 13/286 241/185.5

(Continued)

FOREIGN PATENT DOCUMENTS

DE 3621400 A1 * 1/1988
DE 102017002079 B4 3/2019

OTHER PUBLICATIONS

English translate (DE3621400A1), retrieved date Aug. 18, 2023.*
Proactive Metal Detection & Release System publication, exact date of publication unknown but prior to Jul. 19, 2021.

*Primary Examiner* — Matthew Katcoff
*Assistant Examiner* — Mohammed S. Alawadi
(74) *Attorney, Agent, or Firm* — AVEK IP, LLC; Kent R. Erickson

(57) ABSTRACT

A hammer mill grinder includes a feed conveyor, a press wheel and a rotary hammer mill that is enclosed within a mill box. The mill box presents an intake opening for receiving feed material and a discharge opening for discharging reduced material. The press wheel is located adjacent to the mill box intake opening and is mounted at least indirectly to the mill box for vertical movement. The rotary hammer mill presents hammers that rotate, in cyclic succession, past the intake opening, the press wheel, an inside wall and a screen that is offset from the rotary hammer. The inside wall includes a contaminant bypass door that is able to open to allow a contaminant object to bypass the hammer mill prior to the screen and thereby exit the mill box around the screen to prevent damage to the hammer mill grinder.

20 Claims, 8 Drawing Sheets

(56) References Cited

U.S. PATENT DOCUMENTS

| | | | |
|---|---|---|---|
| 4,449,673 | A | 5/1984 | Cameron |
| 5,230,475 | A | 7/1993 | Gerner |
| 5,505,393 | A | 4/1996 | Serban et al. |
| 6,572,037 | B1 | 7/2003 | Bendzick |
| 6,736,342 | B2 | 5/2004 | Lord |
| 7,090,157 | B2 | 8/2006 | Peterson et al. |
| 7,232,084 | B2 | 6/2007 | Peterson et al. |
| 7,832,670 | B2 | 11/2010 | Peterson et al. |
| 7,900,858 | B2 | 3/2011 | Ragnarsson |
| 2007/0241218 | A1* | 10/2007 | Peterson ............... B02C 13/286 241/73 |
| 2009/0224087 | A1 | 9/2009 | Ragnarsson |

* cited by examiner

HORIZONTAL GRINDER WITH UPWARD ROTATING MILL AND CONTAMINATION BYPASS

CROSS-REFERENCE TO RELATED APPLICATIONS

This application claims the benefit to U.S. Provisional Patent Application No. Ser. No. 63/223,761, filed Jul. 20, 2021, the disclosure of which is incorporated by reference herein.

FIELD

This invention relates to hammer mill grinder with a contaminant bypass door.

BACKGROUND

Industrial grinders, in general, and horizontally fed hammer mills, in particular, are used to process materials into smaller pieces. Large industrial grinders are used for grinding wood, such as wood from storm debris, land clearing, building demolition or other sources into chips which can be disposed of or used for beneficial purposes such as mulch. Such grinders are also used for grinding old tires and solid waste. A common configuration of an industrial grinder is a horizontal mill with an end feed system that includes a conveyor, a press wheel, and a hammer mill box intended to enclose the hammer mill during the feeding process. The hammer mill generally comprises a rotor with a plurality of hammers or grinding tools mounted thereon rotating relative to a screen or grate that encircles a portion of the path of rotation of the rotor. The conveyor is normally a slide chute, drag chains, or a conveyor belt or chain used to move material from the input feed chute into the enclosed hammer mill assembly. In a horizontal hammer mill, the feed material is typically fed into the hammer mill by a conveyor, drag chain, track assembly or belt.

Hammer mills may utilize a press wheel that rides on or presses down against feed material. The press wheel generally comprises a rotating drum positioned on the infeed side of the hammer mill above the feed conveyor. The press wheel may be a passive roller wheel that travels over the top of the feed material to hold the material down or compact it before entering the hammer mill. The press wheel may be power driven—i.e. the roller turns and pushes the feed material into the hammer mill assembly for processing. In order to facilitate the movement of the press wheel over the top of the material, the press wheel assembly preferably allows for vertical deflections so that the roller is able to travel vertically over vertical variations of the feed material. One way to enable the press wheel to deflect vertically is to have the press wheel mounted for rotation to a press wheel carrier that is, in turn, mounted for pivoting movement to the hammer mill box. In some applications, the press wheel is biased downwardly by hydraulics or other means in order to hold the material down as it is being reduced.

A problem that can occur during the operation of a hammer mill is the inadvertent introduction of a contaminant object, such as bulky piece of metal, such as, for example, a railroad spike or a tool such as a hammer or a wrench, into the intake of the hammer mill. Such a contaminant object, hereinafter referred to as a contaminant, can cause considerable damage to the hammer mill especially if it reaches the portion of the hammer mill that is enclosed by the screen if the screen does not give way prior to the contaminant reaching the screen. In existing examples of break-away screens it is known to pivotally mount an initial portion of the screen relative to the rotor and pivot the screen outward away from the rotor to allow detected contaminants to bypass the remaining portion of the screen to reduce damage to the rotor and the screen assembly. See for example, U.S. Pat. No. 7,900,858 of Ragnarson, U.S. Pat. No. 7,832,670 of Peterson et al. and U.S. Pat. No. 7,232,084 to Peterson et al. Although such systems may reduce the amount of damage to the screen assembly and grinding tools, damage is still likely to occur to at least a portion of the screen and must be repaired. There is a need for a hammer mill that is able to provide for a way for a contaminant to bypass the portion of the hammer mill that is enclosed by the screen.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed Description section below. This summary is not intended to identify key features or essential features of the claimed subject matter, nor is it intended to be used as an aid in isolation to determine the scope of the claimed subject matter. In brief, this disclosure describes, among other things, a horizontal grinder with a side tilt press wheel to improve upon the shortcomings of the prior art.

In one embodiment a grinder for reducing the size of material includes a rotary hammer mill enclosed within a mill box. The mill box includes an intake opening for receiving material to be reduced in size and a discharge opening through which reduced material is discharged. The rotary hammer mill includes a rotary hammer that includes hammers rotating through a path of rotation, a cover that covers a first portion of the path of rotation of the hammers and extends past the intake opening, and a screen that covers a second portion of the path of rotation of the hammers past the first portion of the path of rotation of the hammers. Each of the hammers rotates in cyclic succession past the intake opening, the cover and the screen. The cover includes a bypass opening that is covered by a bypass door which selectively opens to allow a contaminant to advance out of the first portion of the path of rotation of the hammers and through the bypass opening prior to the screen to avoid advancement of the contaminant into the second portion of the path of rotation of the hammers covered by the screen.

In another embodiment a horizontally fed hammer mill grinder includes a feed conveyor, a press wheel, a discharge conveyor and a rotary hammer mill that is enclosed within a mill box that normally includes changeable screen grates that can have varying hole sizes to produce the desired size of processed material. The mill box presents an intake opening for receiving feed material and a discharge opening for discharging reduced material. The rotary hammer mill includes a rotary hammer that turns on a powered drive shaft in an up-turning direction at the mill box intake opening. The rotary hammer includes a rotor and a plurality of hammers or grinding tools projecting radially outward from the rotor. The mill box intake opening receives feed material from the feed conveyor and the discharge opening is arranged to allow reduced materials to fall through the bottom of the mill box to the discharge conveyor. The press wheel is situated adjacent to the mill box intake opening and is carried by a press wheel carrier that is pivotably mounted to the mill box by a pivotal connection of a press wheel pivot shaft for movement about a horizontal axis between an operating, downward position in which the press wheel is proximate to the feed conveyor and a raised position in which the press wheel is elevated above the feed conveyor. The raised position is suitable for providing access to the inside of the mill box. In one embodiment a wall of the press wheel carrier engages with a wall of the mill box when the press wheel carrier is pivoted upward or downward without blocking communication between a contaminant bypass duct, discussed below, that is flow connected to the discharge opening. The press wheel and press wheel carrier are able to tilt upward to a lesser extent to accommodate feed materials having varying thicknesses as the press wheel presses down upon the feed materials. The press wheel carrier forms a cover over the rotary hammer mill from the press wheel to the pivotal connection between the press wheel and the mill box and further includes a contaminant bypass door in the cover which will be described in greater detail below.

As the rotary hammer rotates, its hammers, in cyclic succession, pass by the mill box intake opening in an upturning fashion, the press wheel, the inside wall of the press wheel carrier and a semi-cylindrical grate which is known in the art as a “screen”. The inside wall of the press wheel carrier extends between the press wheel and the press wheel pivot shaft which is mounted to the mill box and is located adjacent to screen. The inside wall of press wheel carrier is spaced away from the rotary hammer but that spacing diminishes toward the press wheel pivot shaft where that spacing is at a minimum. This location of minimum spacing, just prior to the screen, is known in the art as the “primary shear point”. The screen presents a multitude of openings that are suitable for the passage of reduced pieces of material through the screen and on to the discharge conveyor.

The inside wall of the press wheel carrier, the cover, includes a contaminant bypass door. The contaminant bypass door is able to pivot between a closed position and an open position. When the contaminant bypass door is open, a passageway is presented that extends through the press wheel carrier and communicates with a portion of the interior of the mill box that bypasses the rotary hammer and leads to the mill box discharge opening. In one embodiment when the contaminant bypass door pivots to the open position, an inside surface of the contaminant bypass door forms a portion of a bypass duct flow connected with the discharge conveyor. Thus, a contaminant is able to pass through the opening presented by the open bypass door, through the press wheel carrier and through the mill box and out through the mill box discharge opening onto the discharge conveyor.

It is known that characteristic vibrations occur when material that includes a potentially destructive contaminant, such as a contaminant object, is first introduced at the mill box intake opening. Accordingly, an accelerometer situated near the mill box intake opening may be employed to detect those vibrations and transmit corresponding signals or data to a control unit. When such vibrations are detected, the control unit may immediately activate actuators that open the contaminant bypass door. Moreover, the control system may also immediately stop or reverse the direction of the feed conveyor and further shut off power to the rotary hammer. Thus, the potentially destructive contaminant object is diverted around the hammer mill and out through the mill box discharge opening and, because the feed conveyor is reversed, the material that included the contaminant object is backed out of the intake feed for further inspection. The bypass door may also be held closed by shear pins selected to shear if a sufficiently large force is directed against the bypass door which would occur if a large metal object is advanced by the rotary hammer against the bypass door.

DETAILED DESCRIPTION

Figure 1:
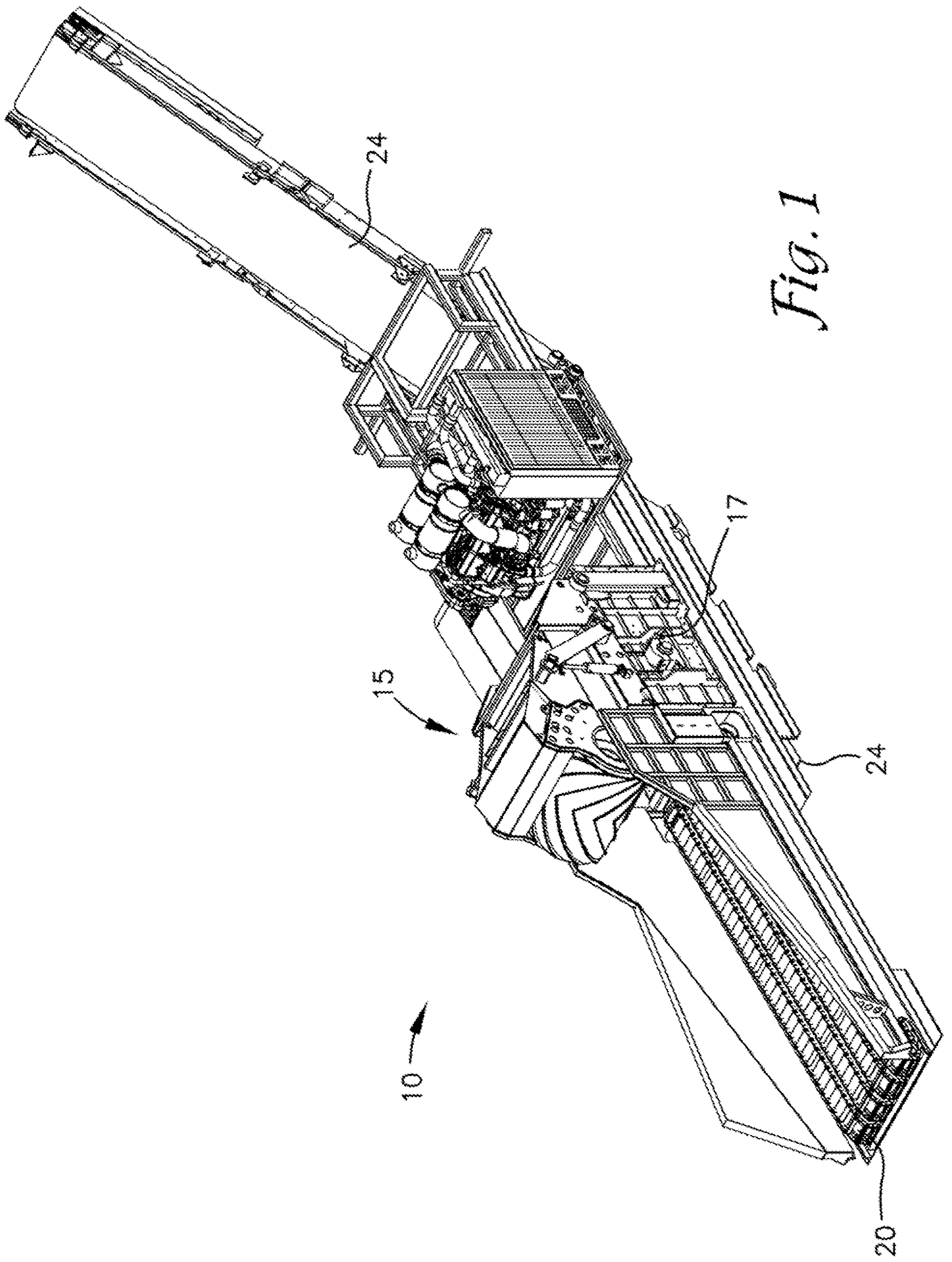
FIG. 1 is a perspective view of one embodiment of a horizontally fed hammer mill grinder.

As required, a detailed embodiment of the present invention is disclosed herein; however, it is to be understood that the disclosed embodiment is merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include an exemplary embodiment of the present invention and illustrate various objects and features thereof.

Certain terminology will be used in the following description for convenience in reference only and will not be limiting. For example, the words “clockwise” or “upwardly,” “downwardly,” “rightwardly,” and “leftwardly” will refer to directions in the drawings to which reference is made. The words “inwardly” and “outwardly” will refer to directions toward and away from, respectively, the geometric center of the embodiment being described and designated parts thereof. Said terminology will include the words specifically mentioned, derivatives thereof and words of a similar import. The word vertical as used in describing vertical movement should not be understood as perfectly, geometrically vertical, but as being generally upward or downward in direction.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" is used with reference to an element is the language intended to be limited to one of the elements specified, or any other similarly limited number of elements.

Figure 2:
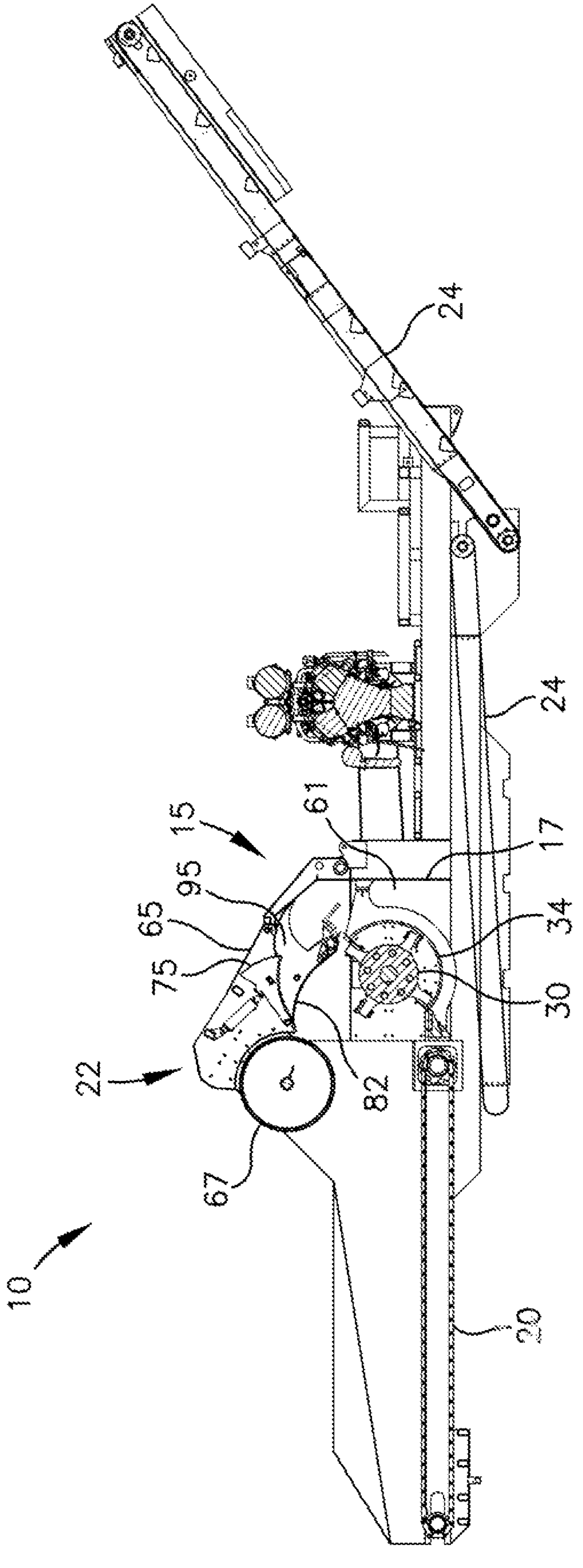
FIG. 2 is a cross-sectional view of the hammer mill of FIG. 1 taken along a longitudinal axis and viewed from the right side.
Figure 3:
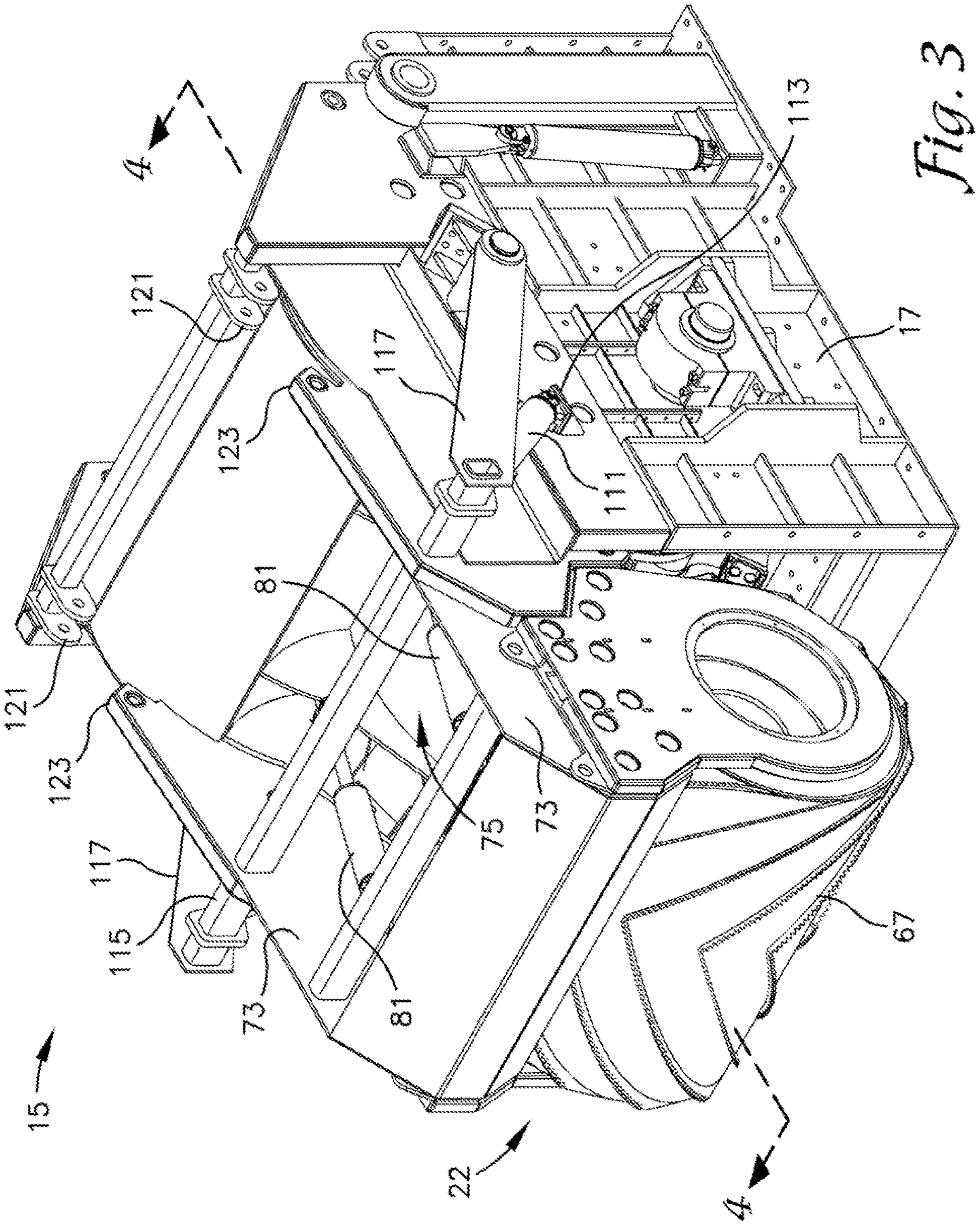
FIG. 3 is a perspective view of a hammer mill including a mill box and a press wheel assembly of the hammer mill grinder as shown in FIG. 1.

Referring to the figures, FIG. 1 provides a perspective view of an embodiment of a horizontally fed hammer mill grinder 10. As can be seen in FIG. 2, horizontally fed hammer mill grinder 10 includes a hammer mill 15 enclosed or housed within a mill box 17, a feed conveyor 20 feeding material into the hammer mill 15, a press wheel assembly or press wheel assembly 22 pressing down on the material fed into the hammer mill 15 on the feed conveyor and, a discharge conveyor 24 conveying ground material away from the hammer mill 15.

Figure 4:
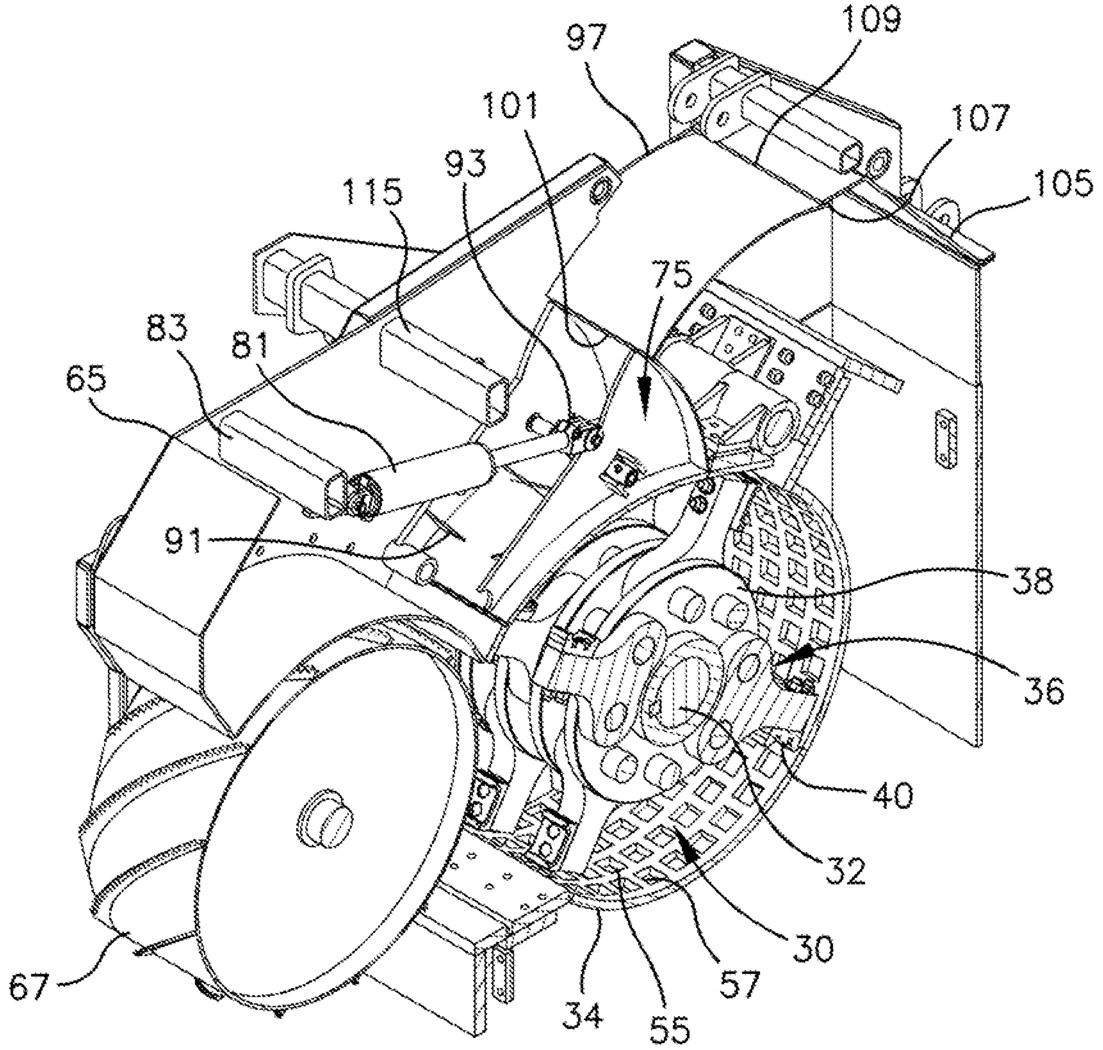
FIG. 4 is a perspective, cross-sectional view of the hammer mill taken along line 4-4 of FIG. 3 with a contaminant bypass door in a closed position.
Figure 5:
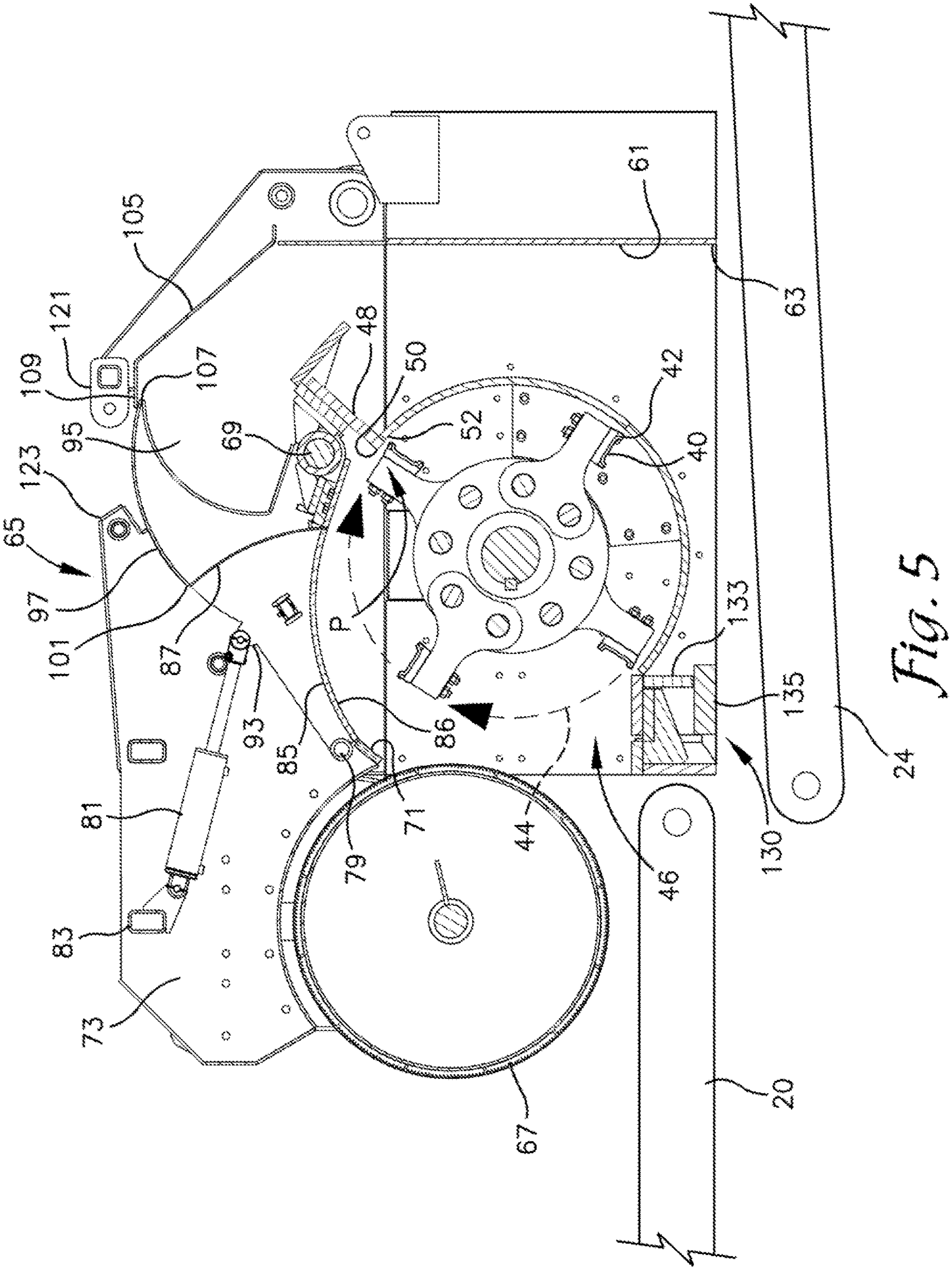
FIG. 5 is a fragmentary, cross-sectional view of one embodiment of the hammer mill grinder taken along a line corresponding to line 4-4 of FIG. 3 but viewed from the right side and further illustrating a feed conveyor and a discharge conveyor associated thererwith.

Referring to FIGS. 4-8, rotary hammer mill 15 includes a rotary hammer 30 that turns on a powered drive shaft 32 and is partially surrounded by a screen or grate 34. In this example, rotary hammer 30 turns in a clockwise direction as viewed in FIGS. 5-7 and upward relative to the discharge end of the feed conveyor 20. The embodiment of the rotary hammer 30 shown includes a series of alternating hammer assemblies 36 and plates 38. Hammer assemblies or hammers 36 are fixed between plates 38 and present a plurality of cutting tools or hammer tips 40 which are preferably designed for removal and replacement. As can be seen in FIGS. 4-8, cutting tools 40 are mounted in a staggered fashion. As is shown in FIG. 5, cutting tools 40 present outer cutting or shearing edges 42 which collectively define or circumscribe a cylindrical processing periphery or zone 44 (indicated in FIG. 5) as rotary hammer 30 turns upon drive shaft 32. It is foreseen that other types of rotary hammers could be utilized including drum type rotors with hammers welded or otherwise attached to the drum.

Figure 6:
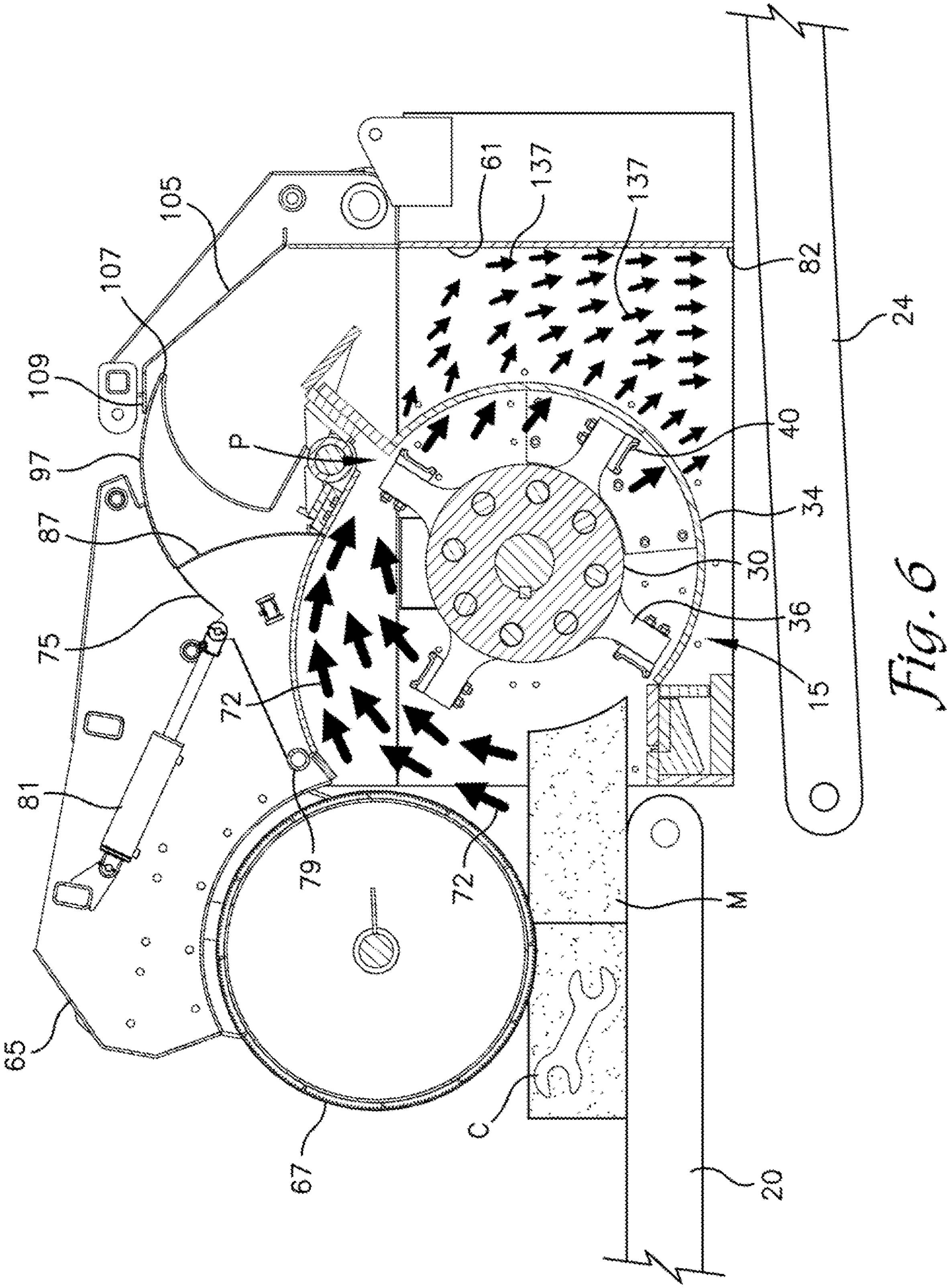
FIG. 6 is a view similar to FIG. 5 but further showing the press wheel assembly pivoted upward with material to be processed being fed under the press wheel and into the mill box.
Figure 7:
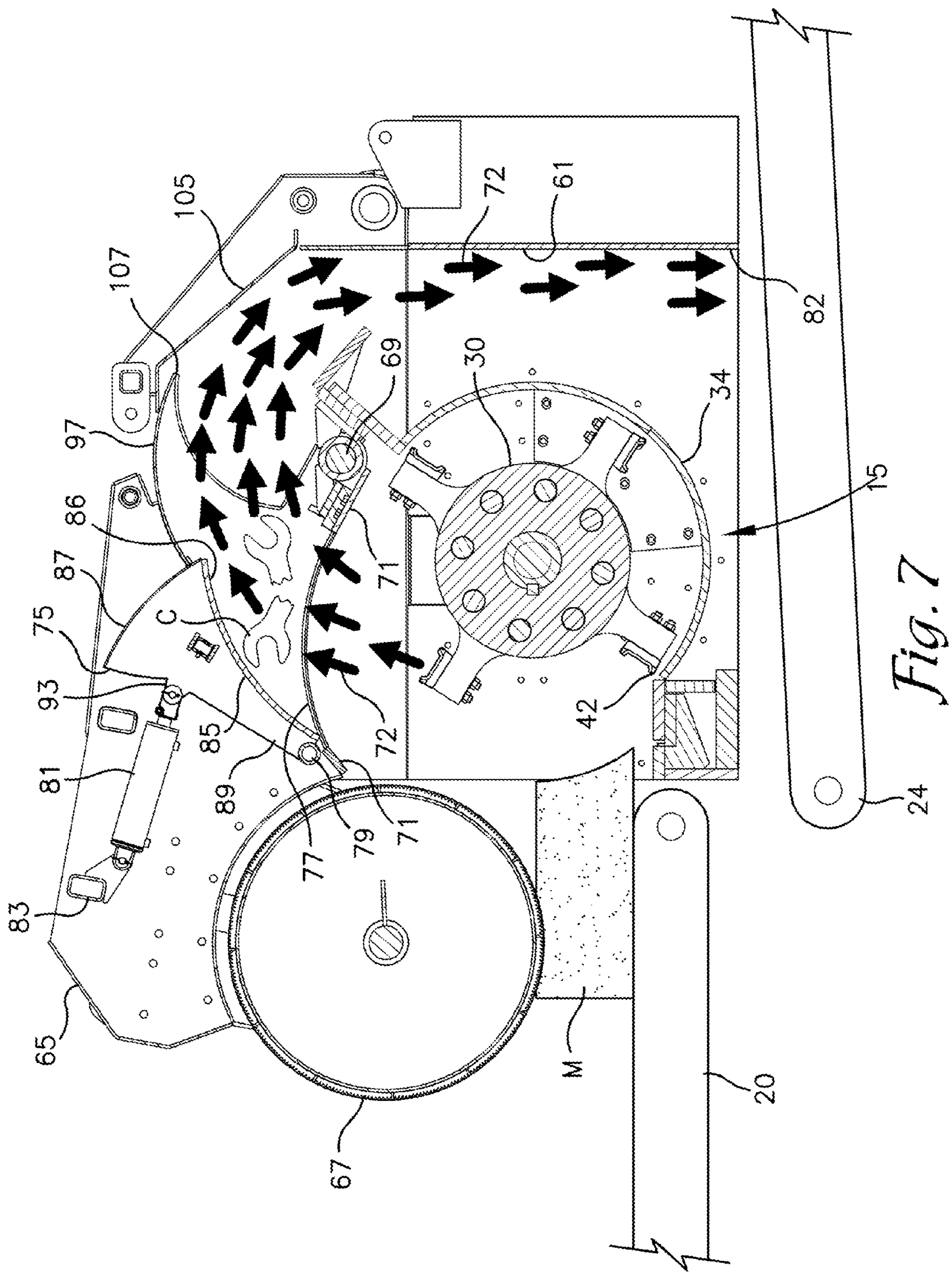
FIG. 7 is a fragmentary, cross-sectional view of one embodiment of the hammer mill grinder similar to FIG. 6 showing the contaminant bypass door in an open position.

As shown in FIGS. 4-8, screen 34, which is formed as a semi-cylindrical grate like structure, extends in spaced relation around approximately half of the cylindrical processing zone 44 of the rotary hammer 30 from approximately ten to thirty degrees past vertical to approximately one hundred to one hundred and twenty degrees past vertical in a clockwise direction when viewed from the right side of the rotary hammer mill 15 as in FIGS. 5-7. The area immediately in front of the rotary hammer 30 which is not enclosed by the screen 34 and adjacent a discharge end of feed conveyor 20 comprises an intake opening 46 of the hammer mill 15. In the embodiment shown, an anvil plate 48 is mounted in the mill box 17 with an inner edge 50 of the anvil plate extending adjacent a leading edge 52 of the screen 34 and in close, radially spaced relation from the cylindrical processing zone 44 of the rotary hammer 30. Upward rotation of the hammer assemblies 36 against material M fed into the intake opening 46 on feed conveyor 20 breaks off portions or chunks of the material which are then advanced against the anvil plate 48 and drawn into the space surrounded by the screen 34 for further processing.

Figure 8:
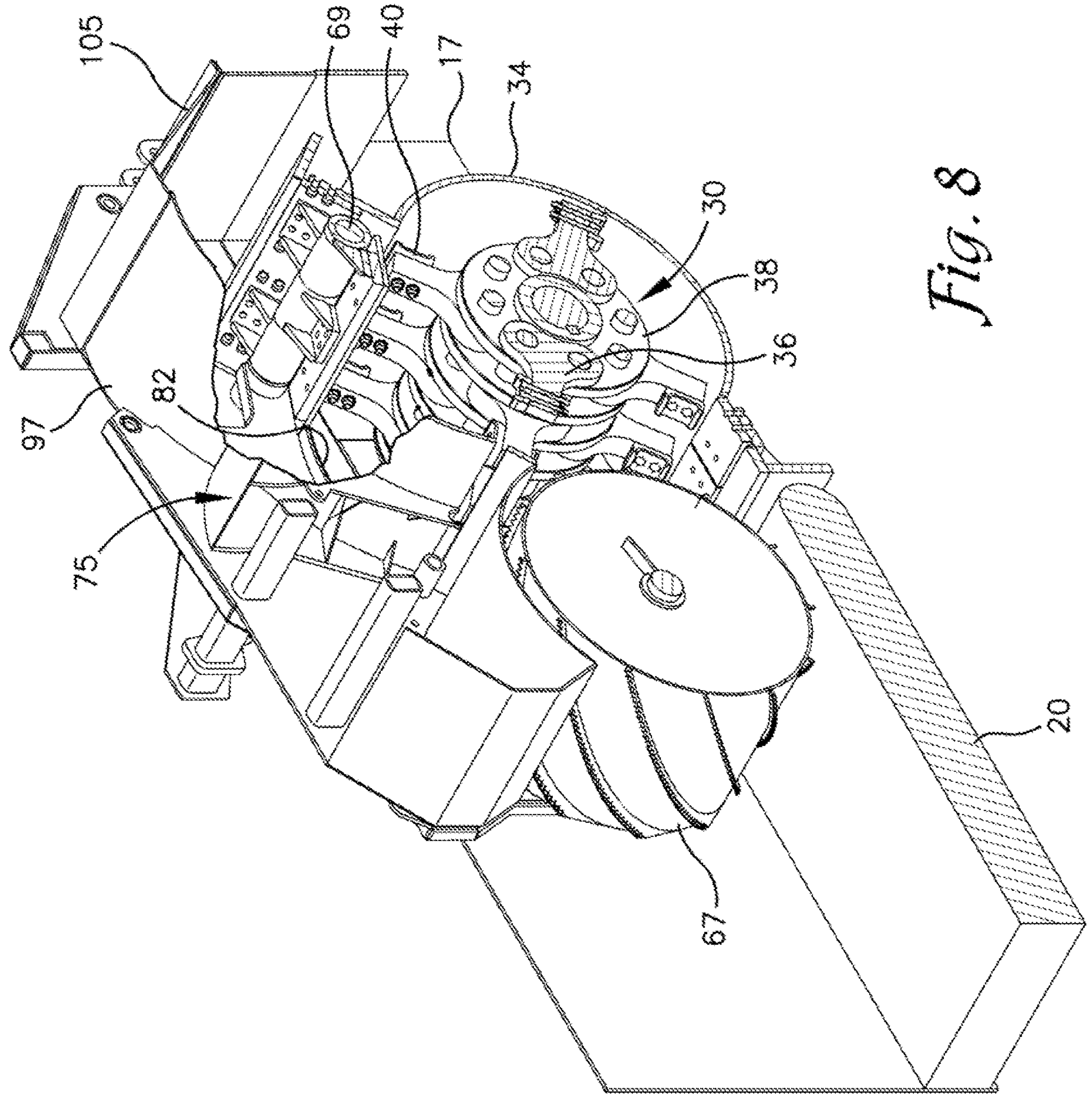
FIG. 8 is a perspective, cross-sectional view of the hammer mill similar to FIG. 4, but showing the contaminant bypass door in the open position and with portions removed to show interior detail thereof.

Screen 34 is preferably fashioned from strong and hard steel with a plurality of holes or perforations 55 formed therethrough. Holes 55 may be formed on the order of one or two inches in width or length. Holes 55 are shown in FIGS. 4 and 8 but have been omitted from all of the other figures for clarity and ease of illustration. The inside surface of screen 34 is closely offset from cylindrical processing zone 44 (indicated in FIG. 5). Holes 55 in screen 34 present shear edges 57 that complement the shearing edges 42 of hammer tips 40. Shear edges 57 adjacent holes 55 cooperate with shearing edges 42 of hammer tips 40 to cut up feed material in order to produce small pieces or chips that are able to fall through holes 55 in screen 34. The chips pass through the holes 55 in the screen 34 into a discharge duct 61 in the mill box 17 and then out through a discharge opening 63 in the mill box 17 situated above discharge conveyor 24. Because the mill box discharge opening 63 receives reduced material passing through screen 34 which extends around roughly one half the rotation of rotary hammer 30, mill box discharge opening 63 extends across substantially the entirety of a bottom or lower end of mill box 17.

Feed material M, represented schematically in FIGS. 6 and 7 and which may for example be tree branches, is pressed between press wheel assembly 22 and feed conveyor 20 as it is fed into mill box 17 and into contact with rotary hammer 30 through intake opening 46. Press wheel assembly 22 includes a press wheel carrier 65 and a press wheel or feed roller 67 which is rotatably mounted to press wheel carrier 65. As is shown in FIG. 6, press wheel 67 is arranged to press downward against and hold the feed material M on the feed conveyor 20 as it is fed into the upwardly rotating rotary hammer 30. Press wheel 67 may be free-wheeling or optionally may be powered. In this example, press wheel 67 is drum shaped and is generally comparable in terms of width and diameter to rotary hammer 30.

Press wheel assembly 22 is able to accommodate feed materials M of varying thicknesses and particularly varying in vertical profile because press wheel assembly 22 is mounted to mill box 17 for pivoting movement about a press wheel pivot shaft 69. Press wheel pivot shaft 69 is mounted to mill box 17 in spaced relation from press wheel 67. In the embodiment shown, press wheel pivot shaft 69 is located above and in close proximity to rotary hammer 30. The upward and downward pivotal movement of press wheel assembly 22 as it rotates on pivot shaft 69 can be seen when comparing FIGS. 5 and 6.

As can be best seen in FIGS. 5-8, press wheel carrier 65 presents a curved inside wall or inner cover 71 that extends from adjacent an inner edge of the press wheel 67 to proximate the pivot shaft 69 and over the intake opening 46. Inside wall 71 is connected to and supported on opposite sides by carrier side walls 73. In the embodiment shown, inside wall 71 is arranged so that the portion of inside wall 71 that is proximate press wheel 67 is spaced radially outward from rotary hammer 30 a greater distance than the portion of inside wall 71 that is proximate pivot shaft 69. Because the distance between the rotary hammer 30 and inside wall 71 diminishes between press wheel 67 and pivot shaft 69, the inside wall 71 functions to funnel or guide chunks of material M, represented by larger arrows 72 that are produced when the rotary hammer 30 first encounters and strikes the feed material M at the intake opening 46 toward the anvil plate 48 and the space between the screen 34 and the rotary hammer 30. In the embodiment shown, this narrow region where the material M is drawn against the inner edge 50 of the anvil plate 48 is known as the primary shear point P and it is indicated in FIG. 5. Anvil plate 48 is preferably mounted within the mill box 17 so that it is able to be removed and replaced due to wear or damage.

A contaminant bypass door 75 extends across a bypass opening 77 formed through the inside wall 71 of the press wheel carrier 65. Contaminant bypass door 75 is located between press wheel 67 and primary shear point P. Contaminant bypass door 75 is pivotally mounted for pivotal movement on a bypass door hinge or bypass door pivot shaft 79 for pivoting between a closed position shown in FIGS. 4-6 and an open position shown in FIGS. 7 and 8. In the embodiment shown, bypass door hinge 79 is mounted on the inside wall 71 of press wheel carrier 65 proximate a forward edge of the bypass opening 77 and proximate to press wheel 67 as shown in FIG. 5. Linear actuators 81, which in the embodiment shown are hydraulic cylinders, are operable to pivot the bypass door 75 into and out of covering relationship with the bypass opening 77. The actuators 81, which may also be pneumatically or electrically operated, are connected between the bypass door 75 and a cross member or actuator mount 83. In the embodiment shown, the actuator mount 83 is formed as a cross member or beam extending between the carrier sidewalls 73 above the inside wall 71.

Actuators 81 are able to rapidly contract from an extended position as shown in FIG. 5 to a retracted position shown in FIG. 7. The extended position maintains bypass door 75 in a closed position relative to the bypass opening 77 as shown in FIG. 5. Retraction of the actuators 81 to the contracted position pivots the bypass door 75 to an open position relative to the bypass opening 77 as shown in FIGS. 7 and 8. As can be seen in FIG. 5, contaminant bypass door 75 presents a door panel 85 with an inner door surface 86 that is generally continuous with inside wall 71 of press wheel carrier 65. It is also preferable that most of the area of inside wall 71 is occupied by door panel 85 in order to maximize the probability that a contaminant C will pass through bypass opening 77 when bypass door 75 is advanced to the open position. It is foreseen that in an alternative embodiment, the bypass opening could be formed in one or more sidewalls of the press wheel carrier to discharge detected contaminant's through one or more of the sidewalls upon opening of an associated bypass door.

Contaminant bypass door 75 is configured to be a relatively lightweight but strong, rigid structure. In the embodiment shown, door panel 85 extends between bypass door pivot shaft 79 and a curved end wall 87. Door panel 85 is supported or reinforced by four evenly spaced support webs 89, including two end support webs and two internal webs that are all fixed, preferably by weldments, to an upper surface of door panel 85 and an inner surface of curved end wall 87. In the embodiment shown, support webs 89 are further reinforced by triangular braces 91 that are fixed, preferably by weldments, to the walls of support webs 89 and the upper surface of door panel 85. Lugs 93 are formed on the internal support webs 89 to which distal ends of the linear actuators 81 are attached.

A bypass duct 95, extending in communication with the discharge duct 61 in mill box 17, is formed on the press wheel carrier 65 rearward of and adjacent to the bypass door 75. Bypass duct 95 is formed by a curved outer duct wall 97 secured to and extending between the carrier side walls 73 in outward spaced relationship from the press wheel carrier pivot shaft 69. Bypass door end wall 87 is curved concentrically around bypass door pivot shaft 79 so that as bypass door 75 opens and closes, the outside surface of end wall 87 closely follows a front or leading edge 101 of curved outer duct wall 97 of press wheel carrier 65. When bypass door 75 is in the open position, as shown in FIGS. 7 and 8, an inside door surface of door panel 85 extends generally in continuous relationship with the inside surface of curved outer duct wall 97 of the bypass duct 95.

The curved outer duct wall 97 of the bypass duct 95 extends between the bypass door 75 and an angled end wall 105 of the mill box 17. The angled end wall 105 forms an inlet to the discharge duct 61. The curved outer duct wall 97 is concentric with press wheel pivot shaft 69 such that a rear or trailing edge 107 of the curved outer duct wall 97 is able to slide under a transverse, inlet edge 109 of angled end wall 105 of mill box 17. When the press wheel 67 and press wheel carrier 65 are at their lowest position relative to the horizontal feed conveyor 20, the trailing edge 107 of the curved outer duct wall 97 extends slightly rearward of and under the inlet edge 109 of the angled end wall 105 of mill box 17. As the press wheel carrier 65 and press wheel 67 are pivoted upward about press wheel pivot shaft 69 and away from the horizontal feed conveyor 20, the trailing edge 107 of the curved outer duct wall 97 extends further under the angled end wall 105 of mill box 17 without blocking the open connection or communication between the bypass duct 95 and discharge duct 61.

Linear actuators or lift cylinders 111 connected between the mill box 17 and the press wheel carrier 65 are operable to pivot the press wheel carrier 65 and attached press wheel 67 about the press wheel pivot shaft 69 to raise and lower the press wheel 67 relative to the horizontal feed conveyor 20. Actuators 111 may be hydraulically, pneumatically or electrically operated. In the embodiment shown the actuators 111 are pivotally connected at first ends to mounts 113 on the mill box and at second ends to a cross-member 115 extending between and through the carrier side walls 73. Lever arms 117 extend between the ends of the cross member and the ends of the press wheel pivot shaft 69 to facilitate lifting of the press wheel carrier 65 by actuators 111. When the actuators 111 are extended and the press wheel carrier 65 pivoted upward about pivot shaft 69, the press wheel carrier 65 and press wheel 67 can be secured in the raised position by inserting pins, not shown, through aligned holes in clevises 121 on the mill box 17 above the inlet edge 109 of angled end wall 105 and holes in lugs 123 formed on the carrier side walls 73.

Actuation of bypass door 75 may be controlled with a bypass door control system 130 which is shown schematically in FIG. 5. The bypass door control system 130 may also be referred to as bypass door controller, door controller or controller 130. Bypass door control system 130 may include a sensor 133 in communication with a control unit or controller 135. Sensor 133, may for example, comprise an accelerometer situated near mill box intake opening 46 and adapted to transmit signals or data to the controller 135 that reveal the detection of vibrations consistent with the rotary hammer 30 striking a contaminant C such as an item formed from metal which could include for example tools or large fasteners or fence material. Controller 135 would respond to such a signal or such data by immediately causing the retraction of bypass door actuators 81 thereby causing bypass door 75 to move to the open position and allowing passage of the contaminant C through bypass opening 77 in press wheel carrier 65 through bypass duct 95, into discharge duct 61, out the discharge opening 82 and onto discharge conveyor 24, bypassing the rotary hammer 30 and screen 34. The controller 135 may also stop feed conveyor 20 or momentarily reverse the direction of feed conveyor 20 when vibrations consistent with a contaminant C have been detected by sensor 133. Controller 135 may also shut off power to or otherwise stop rotation of rotary hammer 30 when vibrations consistent with a contaminant C have been detected.

It is foreseen that other types of sensors 133 could be utilized alone or in combination to detect the presence of contaminants C including, for example, a metal detector positioned proximate the discharge end of the feed conveyor 20. It is also foreseen that pressure sensors connected to hydraulic supply lines for bypass door actuators 81 could detect increases in pressure in the supply line consistent with a metal object striking the bypass door 75 which would then generate a signal to send to the controller 135 to cause the actuators 81 to open the bypass door 75. It is also foreseen that the bypass door 75 could be held shut with shear pins sized to shear and allow the bypass door 75 to open when struck by a contaminant having a sufficiently large mass, such as a sufficiently large metal object.

When the press wheel carrier 65 is pivoted downward with the press wheel 67 pressing against feed material M, the forward edge of the bypass opening 77 and the bypass door pivot shaft 79 are preferably located forward of the cylindrical cutting periphery or path 44 of the rotary hammer 30 and the bypass opening 77 and bypass door 75 extend rearward, past a vertical axis through the rotary hammer 30. The bypass opening 77 and door 75 are positioned above the upward path of rotation of the rotary hammer 30, as described herein, so that contaminants C advanced into the rotational path of hammer assemblies 36 are thrown upward through the bypass opening 77 upon opening of the bypass door 75.

During operation, material M, such as branches or other grindable material, is placed on the feed conveyor 20 and conveyed towards the hammer mill 15. The press wheel carrier 65 is pivoted downward from a raised position so that the press wheel 67 rides over and presses downward on the material M on the feed conveyor 20 conveyed to the hammer mill 15. The material M is fed past the discharge end of the feed conveyor 20, into the mill box 17 and through the intake opening 46 and into contact with the upwardly rotating hammer assemblies 36 of the rotary hammer 30. The rotating hammer assemblies 36 contact the material M breaking off chunks which are directed by rotation of the rotary hammer 30 and the inside wall 71 of the press wheel carrier 65 into the primary shear point P and between the rotary hammer 30 and screen 34. The hammer assemblies 36 carry the chunks of material M into the space between the hammer assemblies 36 and screen 34 to further process the chunks of material M into smaller pieces, represented by arrows 137 which pass through the holes 55 in the screen 34. Material passing through the holes in the screen 55 fall through the discharge duct 61 and onto the discharge conveyor 24 which conveys the processed material away from the hammer mill 15.

When contaminant bypass door 75 is advanced to the open position as shown in FIGS. 7 and 8, such as upon detection of a contaminant C in the feed material M, the contaminant C (indicated in FIGS. 6 and 7) is ejected through bypass opening 77 in press wheel carrier 65 and into the bypass duct 95 before contaminant C reaches primary shear point P and the portion of hammer mill 15 where rotary hammer 30 is enclosed by screen 34. In FIG. 7, the joints of the end walls of mill box 17 and press wheel carrier 65 have been removed for clarity to show unobstructed communication between the bypass duct 95 on press wheel carrier 65 and the discharge duct 61 in mill box 17. As can be seen in FIGS. 7 and 8, when bypass door 75 is in the open position, an open path is made available that communicates through roller carrier 65 and through mill box 17 that bypasses rotary hammer 30 and screen 34. A contaminant that is ejected through open bypass door 75 will pass through roller carrier 65, through mill box 17, that is, around rotary hammer 30 and screen 34, down through discharge opening 82 and onto discharge conveyor 24.

It is foreseen that the press wheel carrier 65 could be pivotally mounted to and above the horizontal feed conveyor 20 in front of the press wheel 67 in which case, the press wheel carrier 65 would not extend over the hammer mill 15. In such an application, a cover, separate from the carrier could be positioned over the hammer mill 15 and may for example be secured to and extend between sidewalls 73 of mill box 17. Such a cover, would have a bypass opening formed therein and a bypass door pivotally mounted over the bypass opening and opening into a bypass duct formed above the cover in communication with a discharge duct in the mill box 17 extending downstream of the hammer mill 15. Contaminants C would be ejected through the bypass opening away from which the bypass door had been pivoted to allow the contaminant C to pass through bypass duct, to the discharge duct and onto the discharge conveyor while bypassing the hammer mill 15. It is also foreseen that the press wheel carrier 65 could be mounted on a side tilt frame to pivot to a side of the grinder frame to facilitate maintenance as in U.S. Pat. No. 8,905,344 of Brian Bergman assigned to C. W. Mill Equipment Co., Inc.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed as new and desired to be secured by Letters Patent is:

1. A grinder comprising:

a feed conveyor, a press wheel, a discharge conveyor and a rotary hammer mill, the rotary hammer mill enclosed within a mill box, the mill box having an intake opening formed therein for receiving material to be reduced in size and a discharge opening formed therein through which reduced material is discharged, the press wheel located adjacent to the intake opening into the mill box and mounted on a press wheel carrier, the press wheel carrier is pivotally mounted by a pivotal connection to the mill box about a horizontal axis to allow upward and downward pivoting of the press wheel relative to the feed conveyor, the rotary hammer mill including a rotary hammer, a screen and a cover, the cover formed on the press wheel carrier and the cover extending between the press wheel and the pivotal connection between the press wheel carrier and the mill box, the rotary hammer comprising a plurality of hammers rotating through a path of rotation, the cover covering a first portion of the path of rotation of the rotary hammer and the screen covering a second portion of the path of rotation of the rotary hammer, each of the plurality of hammers rotating in cyclic succession past the intake opening, the press wheel, the cover and the screen, the cover including a bypass opening formed through the cover that is covered by a bypass door which selectively opens to allow a contaminant to advance out of the path of rotation of the rotary hammer and through the bypass opening prior to the screen.

2. The grinder in claim 1, wherein a wall of the press wheel carrier engages with a wall of the mill box when the press wheel carrier is pivoted upward or downward about the pivotal connection between the press wheel and the mill box for movement of the press wheel without blocking communication between a bypass duct and a discharge duct.

3. The grinder of claim 1, wherein the bypass door is pivotably connected to the press wheel carrier adjacent to the press wheel.

4. The grinder of claim 1, wherein the bypass door is actuated by an actuator for movement between a closed position and an open position.

5. The grinder of claim 1, wherein the cover extends over the rotary hammer mill and the bypass door is pivotably connected to the press wheel carrier.

6. The grinder of claim 5, wherein the bypass door is actuated by an actuator for movement between a closed position extending in covering relationship to the bypass opening and an open position wherein the bypass door is advanced out of covering relationship with the bypass opening.

7. The grinder in claim 1 further comprising a bypass door control system and a sensor in communication with the bypass door control system, wherein actuation of an actuator is controlled by the bypass door controller in response to data transmitted from the sensor to the bypass door controller to cause retraction of the actuator causing the bypass door to move to an open position in relation to the bypass opening and allow passage of the contaminant into a bypass duct bypassing the second portion of the path of rotation of the rotary hammer surrounding the screen.

8. The grinder in claim 1, wherein a discharge duct is formed in the mill box on a side of the screen opposite the rotary hammer to receive reduced material passing through the screen, the discharge opening formed in the discharge duct such that reduced material received in the discharge duct passes through the discharge opening, and wherein pivoting of the bypass door to the open position relative to the bypass opening flow connects the bypass opening to the discharge duct through a bypass duct.

9. The grinder as in claim 1, wherein a discharge duct is formed in the mill box on a side of the screen opposite the rotary hammer to receive reduced material passing through the screen, the discharge opening formed in the discharge duct such that reduced material received in the discharge duct passes through the discharge opening, and wherein, upon pivoting of the bypass door to the open position relative to the bypass opening an inside surface of the bypass door forms a portion of a bypass duct flow connected with the discharge duct in the mill box.

10. A grinder, comprising:

a rotary hammer mill enclosed within a mill box; the rotary hammer mill comprising a rotary hammer with a plurality of hammers rotating about a horizontal axis in cyclic succession past an intake opening, a press wheel, a cover and a screen, a feed conveyor feeding material into the rotary hammer mill via the intake opening, the press wheel mounted on a press wheel carrier pressing down on material fed into the rotary hammer mill on the feed conveyor and a discharge conveyor conveying ground material away from the rotary hammer mill, wherein the press wheel carrier is pivotally mounted for upward and downward movement proximate the mill box about a carrier pivot axis, the cover is formed on the press wheel carrier and a bypass door is pivotally mounted to the press wheel carrier and advanceable into and out of covering relationship with a bypass opening formed in the cover, the cover is formed on the press wheel carrier between the press wheel and a primary shear point, the cover is spaced radially outward from the rotary hammer and a screen partially encloses the rotary hammer between the primary shear point and the feed conveyor.

11. The grinder in claim 10, further comprising a bypass duct adjacent to the bypass opening and extending in communication with a discharge duct.

12. The grinder of claim 11, wherein a wall of the press wheel carrier engages with a wall of the mill box when the press wheel carrier is pivoted upward or downward about the carrier pivot axis for movement of the press wheel without blocking communication between the bypass duct and the discharge duct.

13. The grinder in claim 11, wherein an inner surface of the bypass door forms the bypass duct when the bypass door is open relative to the bypass opening.

14. The grinder of claim 10, further comprising at least one actuator that selectively pivots the bypass door into and out of covering relationship with the bypass opening, selectively opening to allow a contaminant to bypass the rotary hammer prior to the screen.

15. A grinder for reducing the size of material comprising:

a rotary hammer mill enclosed within a mill box, the mill box including an intake opening for receiving material to be reduced in size and a discharge opening through which reduced material is discharged, the rotary hammer mill including a plurality of hammers rotatably mounted within the mill box and rotating through a path of rotation, the rotary hammer mill further including a screen mounted in the mill box in radially outward spaced relation from a second portion of the path of rotation of the plurality of hammers;

a feed conveyor positioned to feed material into the rotary hammer mill via the intake opening;

a press wheel rotatably mounted on a press wheel carrier, the press wheel carrier pivotally mounted relative to the mill box for upward and downward pivoting of the press wheel relative to the feed conveyor and upward and downward pivoting of the press wheel carrier relative to the rotary hammer mill and about a carrier pivot axis, the press wheel carrier presenting a cover extending between the press wheel and the carrier pivot axis, the cover extending over a first portion of the path of rotation of the plurality of hammers when the press wheel carrier is pivoted downward, the first portion of the path of rotation of the plurality of hammers extending between the intake opening and the second portion of the path of rotation of the plurality of hammers, a bypass opening is formed through the cover and a bypass door is pivotably mounted on the press wheel carrier and pivotable into and out of covering relationship with the bypass opening; the bypass door is selectively advanceable out of covering relationship with the bypass opening to allow a contaminant to advance out of the first portion of the path of rotation of the hammers and through the bypass opening prior to the screen to avoid advancement of the contaminant into the second portion of the path of rotation of the hammers covered by the screen.

16. The grinder of claim 15, wherein the bypass door is pivotably connected to the press wheel carrier adjacent to the press wheel.

17. The grinder of claim 15, wherein the bypass door is pivotable into an out of covering relationship with the bypass opening by an actuator.

18. The grinder in claim 17 further comprising a bypass door control system and a sensor in communication with the bypass door control system, wherein actuation of the actuator is controlled by the bypass door controller in response to data transmitted from the sensor to the bypass door controller to cause retraction of the actuator causing the bypass door to move to an open position in relation to the bypass opening and allow passage of the contaminant into a bypass duct bypassing the second portion of the path of rotation of the rotary hammer surrounding the screen.

19. The grinder in claim 15, wherein a discharge duct is formed in the mill box on a side of the screen opposite the hammer to receive reduced material passing through the screen, the discharge opening formed in the discharge duct such that reduced material received in the discharge duct passes through the discharge opening, and wherein pivoting of the bypass door out of covering relationship with the bypass opening flow connects the bypass opening to the discharge duct through a bypass duct.

20. The grinder as in claim 15, wherein a discharge duct is formed in the mill box on a side of the screen opposite the hammers to receive reduced material passing through the screen, the discharge opening is formed in the discharge duct such that reduced material received in the discharge duct passes through the discharge opening, and wherein, upon pivoting of the bypass door out of covering relationship with the bypass opening, an inside surface of the bypass door forms a portion of a bypass duct flow connected with the discharge duct in the mill box.

* * * * *